US012655666B2

(12) United States Patent
Duer

(10) Patent No.: US 12,655,666 B2
(45) Date of Patent: Jun. 16, 2026

(54) FITTING FOR MOVABLY MOUNTING A PIVOTING ELEMENT

(71) Applicant: Julius Blum GmbH, Hoechst (AT)

(72) Inventor: Stefan Duer, Schwarzach (AT)

(73) Assignee: JULIUS BLUM GMBH, Hoechst (AT)

( * ) Notice: Subject to any disclaimer, the term of this patent is extended or adjusted under 35 U.S.C. 154(b) by 21 days.

(21) Appl. No.: 18/748,970

(22) Filed: Jun. 20, 2024

(65) Prior Publication Data

US 2024/0337141 A1 Oct. 10, 2024

Related U.S. Application Data

(63) Continuation of application No. PCT/AT2022/060448, filed on Dec. 16, 2022.

(30) Foreign Application Priority Data

Dec. 21, 2021 (AT) .............................. A 51028/2021

(51) Int. Cl.
*E05D 15/00* (2006.01)
*E05D 3/18* (2006.01)

(52) U.S. Cl.
CPC ............ *E05D 3/18* (2013.01); *E05Y 2900/20* (2013.01)

(58) Field of Classification Search
CPC ....... E05D 15/264; E05D 15/34; E05D 15/28; E05D 15/30; E05D 15/32; E05D 3/06;
(Continued)

(56) References Cited

U.S. PATENT DOCUMENTS 3,900,964 A * 8/1975 Krein ...................... E05D 15/10 49/214
5,896,619 A * 4/1999 Koopman ............ E05F 1/1253 16/68
(Continued)

FOREIGN PATENT DOCUMENTS

AT 521841 5/2020
DE 31 20 061 12/1982
(Continued)

OTHER PUBLICATIONS

Englich Translation (FR 2490709 A1, Mar. 26, 1982).*
International Search Report issued Mar. 20, 2023 in International (PCT) Application No. PCT/AT2022/060448.

*Primary Examiner* — Chuck Y Mah
(74) *Attorney, Agent, or Firm* — Wenderoth, Lind & Ponack, L.L.P.

(57) ABSTRACT

A fitting includes a first fitting part on a stationary carrier and a second fitting part on a pivoting element so that the fitting parts are movable relative to each other. An articulated lever is connected in an articulated manner to the first fitting part via a first hinge pin, and is connected in an articulated manner to the second fitting part via a second hinge pin. A guide device is linearly displaceable on or in one of the two fitting parts, and is connected in an articulated manner to the other of the two fitting parts via a third hinge pin which is separate and distanced from the first hinge pin and/or the second hinge pin. At least two articulated levers are respectively connected in an articulated manner to the first fitting part via the first hinge pin and to the second fitting part via the second hinge pin.

15 Claims, 6 Drawing Sheets

(58) Field of Classification Search

CPC .... E05D 3/08; E05D 3/14; E05D 3/16; E05D 3/18; E05D 3/183; E05D 2003/166; E05D 16/366; E05D 16/362; E06B 7/36; E06B 7/367; E05Y 2900/20; E05Y 2900/212

See application file for complete search history.

(56) References Cited

U.S. PATENT DOCUMENTS

| | | | | |
|---|---|---|---|---|
| 5,931,554 | A * | 8/1999 | Koopman | E05F 1/1253 312/319.2 |
| 6,453,511 | B2 | 9/2002 | Sato | |
| 7,068,208 | B2 | 6/2006 | Wu | |
| 7,406,749 | B2 | 8/2008 | Herper | |
| D649,010 | S | 11/2011 | Spragg | |
| D649,430 | S | 11/2011 | Spragg | |
| 8,572,808 | B2 * | 11/2013 | Bonomie | E05F 3/20 16/374 |
| 10,563,904 | B2 | 2/2020 | Kim et al. | |
| 10,822,852 | B1 * | 11/2020 | Nuss | E05F 1/1253 |
| 11,047,612 | B2 | 6/2021 | Kim et al. | |
| 11,261,631 | B2 * | 3/2022 | Güzeltepe | E05D 3/18 |
| 11,739,577 | B2 | 8/2023 | Duer et al. | |
| 11,982,114 | B2 | 5/2024 | Duer | |
| 2002/0002756 | A1 | 1/2002 | Sato | |
| 2004/0252045 | A1 | 12/2004 | Wu | |
| 2005/0177980 | A1 | 8/2005 | Herper | |
| 2007/0159037 | A1 | 7/2007 | Hoffman | |
| 2012/0079683 | A1 | 4/2012 | Spragg | |
| 2018/0187956 | A1 | 7/2018 | Kim et al. | |
| 2020/0149800 | A1 | 5/2020 | Kim et al. | |
| 2021/0262258 | A1 | 8/2021 | Duer et al. | |
| 2022/0056744 | A1 | 2/2022 | Duer | |
| 2022/0178187 | A1 * | 6/2022 | Gunn | E05D 3/14 |

FOREIGN PATENT DOCUMENTS

| | | | |
|---|---|---|---|
| DE | 202 07 036 | | 10/2003 |
| DE | 10 2009 009 719 | | 9/2010 |
| EP | 3 343 152 | | 7/2018 |
| FR | 2 490 709 | | 3/1982 |
| JP | 55-78775 | | 6/1980 |
| JP | 2002-019640 | | 1/2002 |
| JP | 2009-270376 | | 11/2009 |
| KR | 2012122428 | A * | 11/2021 |
| TW | 202031990 | | 9/2020 |
| TW | I737556 | | 8/2021 |
| TW | 202225543 | | 7/2022 |
| WO | 2018/129574 | | 7/2018 |
| WO | 2020/232490 | | 11/2020 |

* cited by examiner

FITTING FOR MOVABLY MOUNTING A PIVOTING ELEMENT

The present application is a continuation of International Application PCT/AT2022/060448 filed on Dec. 16, 2022. Thus, all of the subject matter of International Application PCT/AT2022/060448 is incorporated herein by reference.

BACKGROUND OF THE INVENTION

The invention relates to a fitting for movably mounting a pivoting element, in particular a furniture part, a door, or a window, relative to a stationary support, and a piece of furniture with such a fitting.

Such a fitting is known, for example, from the applicant's own document A 50977/2018, or also from one of the documents US 2004/0252045 A1, DE 202 07 036 U1, EP 3 343 152 A1 and WO 2020/232490 A1. That document proposes a hinge mechanism with at least 5 hinge pins and several articulated levers. A disadvantage of such a fitting is the relatively complex formation of the hinge mechanism. On the one hand, this results in an increased material requirement and manufacturing effort, which brings with it higher costs. On the other hand, complex mechanics of the hinge mechanism are more prone to contamination, defects or the like.

A 50977/2018 also discloses a piece of furniture with such a hinge. A pivoting element can cover a front side of a side wall at least in sections, preferably substantially completely. In this way, in a view of the piece of furniture from the front, there is overall a smooth surface-without the formation of a step or gap, visible from the front, between the side wall and the pivoting element. This positive effect is to be retained.

SUMMARY OF THE INVENTION

The objective technical problem of the present invention is therefore to specify a fitting that is improved compared with the state of the art, in which the disadvantages of the state of the art are at least partially remedied, and which in particular retains the above-named positive effect. In addition, a piece of furniture with such a fitting is to be specified.

A guide device is accordingly provided, wherein the guide device is mounted linearly displaceably on or in one of the two fitting parts and connected in an articulated manner to the other of the two fitting parts via a third hinge pin. The third hinge pin is formed separate and at a distance from the first hinge pin and/or the second hinge pin, and at least two, preferably precisely two, articulated levers are provided. The at least two articulated levers are in each case connected in an articulated manner to the first fitting part via the first hinge pin and in an articulated manner to the second fitting part via the second hinge pin.

The guide device makes the reduction to three hinge pins possible, as a result of which the complexity of the hinge mechanism and thus of the fitting can in turn be reduced. The arrangement of the hinge pins makes it possible for a pivoting element to cover a front side of a side wall at least in sections, preferably substantially completely.

Moreover, the pivoting element is thereby already stabilized by the fitting. In addition, a vertical load transfer can be effected via only one articulated lever.

Furthermore, a damping of a pivoting movement of the pivoting element can be easily implemented by an embedded damper in the case of a proposed fitting.

If a second articulated lever is provided, higher forces and moments can be absorbed by the articulated levers. In addition, a further articulated lever additionally stabilizes a pivoting movement of the fitting.

With respect to a piece of furniture, the piece of furniture comprises a pivoting element, a stationary support, and at least one fitting according to the invention. The pivoting element is formed as a movable furniture part, and the stationary support is formed as a furniture carcass.

According to an advantageous design of the invention, the at least one articulated lever is formed substantially L-shaped.

The L-shaped formation of the at least one articulated lever makes it possible, in conjunction with the arrangement of the hinge pins, to predefine a trajectory, along which a pivoting element can be pivoted.

The guide device can also comprise a guide element and a mounting element, wherein the guide element is mounted linearly displaceably in the mounting element.

In addition, the guide element can have a connecting section, via which the guide element is connected in an articulated manner to one of the two fitting parts via the third hinge pin.

This represents simple and uncomplicated possibilities for implementing a guide device.

According to an advantageous embodiment of the invention, the guide element can have a circular or polygonal cross-sectional area.

Depending on requirements, a cross section can thus be chosen which allows or prevents a twisting of the guide element in the mounting element.

The mounting element can comprise at least one sliding element, preferably two sliding elements.

It has in particular proved to be advantageous if the at least one sliding element is arranged in a recess in the first fitting part, wherein the guide element is guided linearly displaceably in the sliding element.

It is thereby possible to select the material of the sliding elements independently of the material of the fittings. In addition, the sliding elements can be easily replaced should any wear occur.

Preferably, the second fitting part is formed in two parts.

Particularly preferably, the second hinge pin is allocated to a first part of the second fitting, and the third hinge pin is allocated to a second part of the second fitting.

Via the two-part formation of the second fitting part, the formation of the hinge pins separately and at a distance can be easily implemented. Furthermore, material can be saved in the case of the second fitting part.

As regards a piece of furniture, the pivoting element can be moved by the fitting between a first position, in which the pivoting element at least partially covers a front side of the side wall, and a second position, in which the pivoting element can travel in a depth direction of the stationary support.

As a result, in a view of the piece of furniture from the front, there is overall a smooth surface-without the formation of a step or gap, visible from the front, between the side wall and the pivoting element. The overall visual impression of a piece of furniture is thus considerably enhanced.

Preferably, the stationary support has at least one side wall, and the pivoting element is arranged substantially parallel to the side wall in a second position.

Due to the parallel arrangement of the pivoting element with the side wall in the first position, an interior space of the piece of furniture is easily accessible in the second position.

Particularly preferably, the stationary support has at least two side walls, and the at least two side walls form a cavity, into which a pivoting element can travel in the depth direction of the stationary support in the second position.

A pivoting element is thus barely visible anymore in a second position, as a result of which on the one hand the pivoting element does not extend beyond the piece of furniture and on the other hand a visually appealing overall impression of the piece of furniture is promoted.

According to a preferred embodiment of the invention, at least two fittings according to the invention are provided. This increases the stability of a piece of furniture considerably.

BRIEF DESCRIPTION OF THE DRAWINGS

Further details and advantages of the present invention are explained in more detail below with the aid of the description of the embodiments represented in the drawings, in which.

DETAILED DESCRIPTION OF THE INVENTION

Figure 1A:
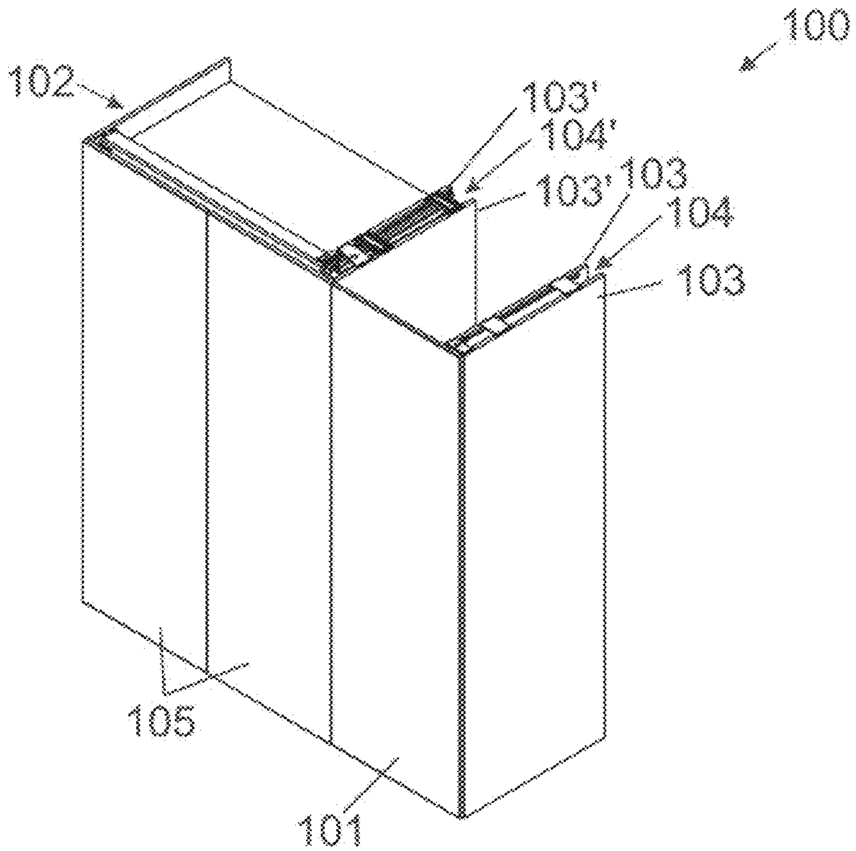
FIG. 1*a* is a perspective view of a piece of furniture in a first position.
Figure 1B:
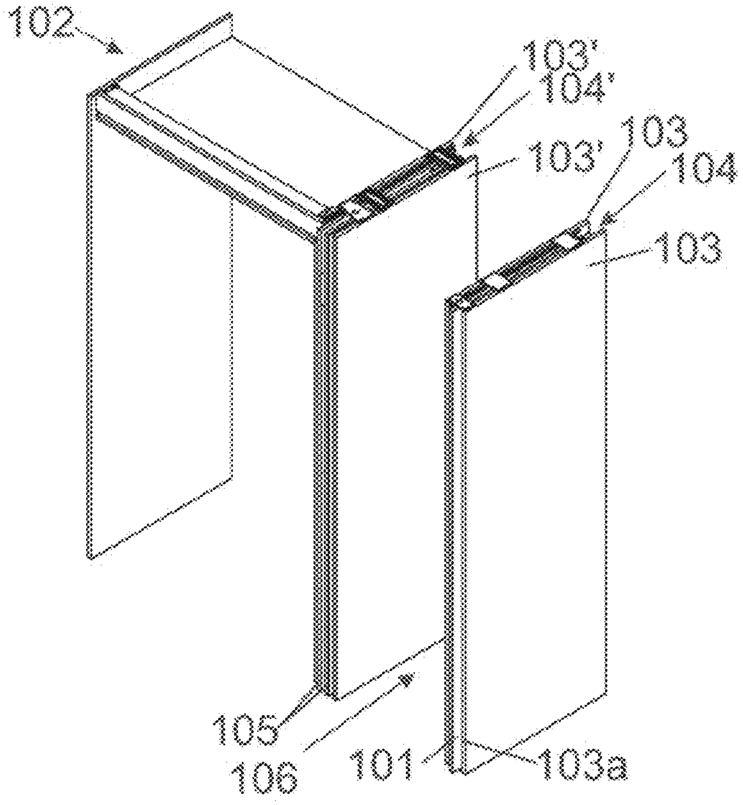
FIG. 1*b* is a perspective view of a piece of furniture in a second position.

FIG. 1*a* shows a perspective view of a piece of furniture 100 in a first position, FIG. 1*b* shows the same piece of furniture 100 in a second position.

It can be seen that the piece of furniture 100 has a stationary support 102 in the form of a furniture carcass. In addition, a pivoting element 101 in the form of a door leaf is visible.

In the first position, according to FIG. 1*a*, the pivoting element 101 conceals a front side 103*a* of a side wall 103. The pivoting element 101 furthermore adjoins a folding sliding door 105 flush therewith, which results in a continuous furniture front and thus a visually appealing overall impression of the piece of furniture 100 in the first position.

It can also be seen that a second side wall 103 is provided, wherein the side walls 103 form a cavity 104.

In the second position, according to FIG. 1*b*, the pivoting element 101 is arranged substantially completely in the cavity 104. An interior space 106 is thus easily accessible. In addition, the pivoting element 101 does not extend into a room, with the result that the pivoting element 101 is not in the way.

In the present embodiment example, a part of the piece of furniture 100 adjoining the pivoting element 101 is equipped with a folding sliding door 105, which can be arranged in a cavity 104' formed by two other side walls 103'.

However, it can also be provided that here no further part adjoins the pivoting element 101, i.e. that the stationary support 102 is substantially as wide as the pivoting element 101. However, several identical pivoting elements 101 can also be arranged next to each other.

Figure 2:
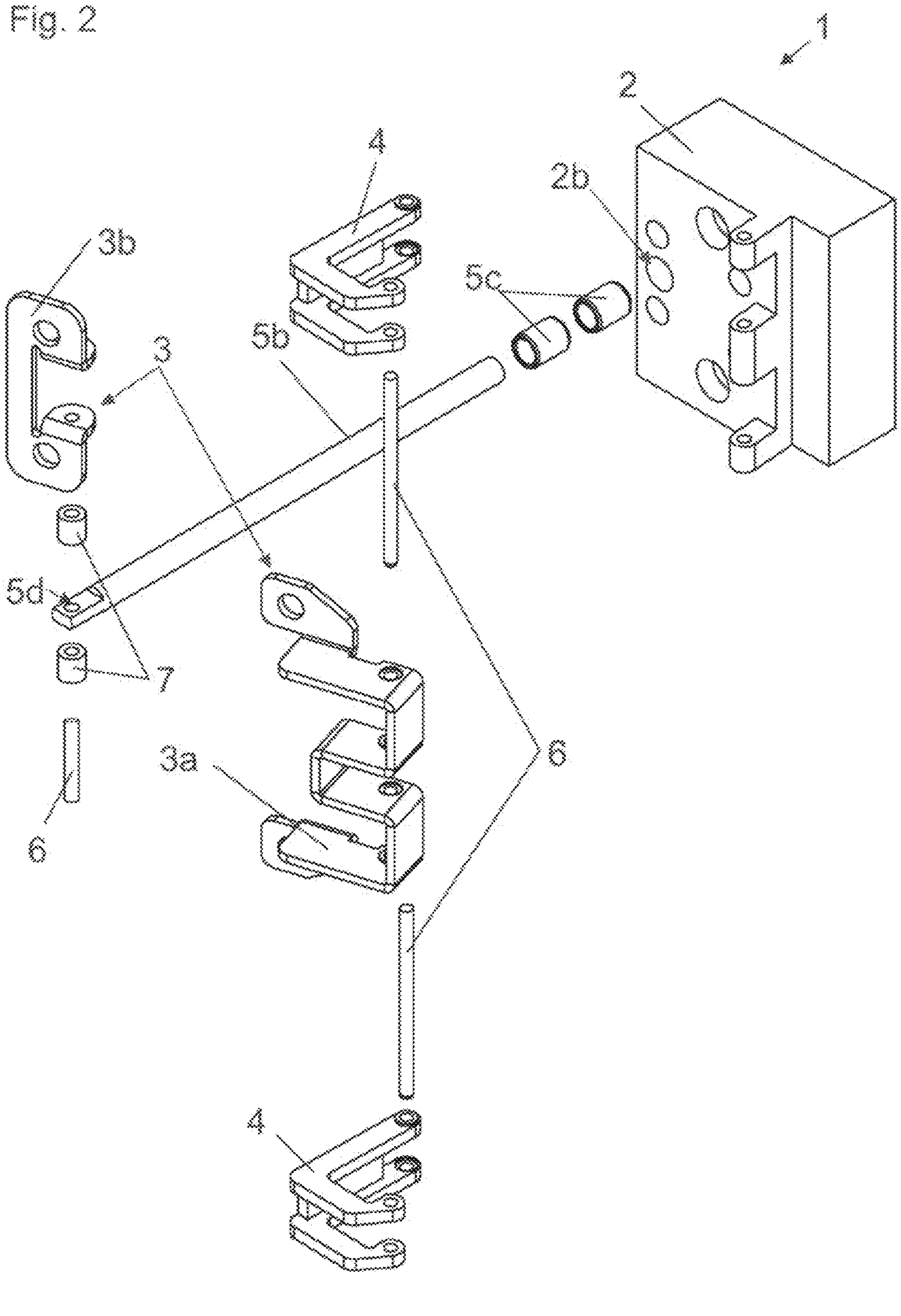
FIG. 2 is an exploded representation of a fitting.

FIG. 2 shows an exploded representation of a fitting 1. A first fitting part 2 and a two-part second fitting part 3, consisting of a first part 3*a* and a second part 3*b*, can be seen.

The first fitting part 2 has a recess 2*b*, into which two mounting elements 5*c* can be inserted. The mounting elements 5*c* can be made of a different material from the first fitting part 2, for example in order to achieve better sliding properties. It is also conceivable that only one mounting element 5*c* or alternatively also more than two mounting elements 5*c* is/are provided.

A guide element 5*b* is guided in the mounting elements 5*c*. In the present case, both the mounting elements 5*c* and the guide element 5*b* have a circular cross section, but essentially any other cross section is conceivable.

The guide element 5*b* has a connecting section 5*d*, via which the guide element 5*b* can be connected to the second part 3*b* of the second fitting part 3. For this, a hole which can receive a connecting pin 6 is provided in the connecting section 5*d*. Holes for receiving the connecting pin 6 are also provided in the second part 3*b* (and a spacer 7 can be located between each of the respective holes and the connecting section 5*d*), whereby an articulated connection between guide element 5*b* and second fitting part 3 is implemented.

The articulated levers 4 are also connected in an articulated manner to the first fitting part 2 or the first part 3*a* of the second fitting part 3 via connecting pins 6. In the present example, two articulated levers 4 are provided, which brings with it the advantage that higher forces and moments can be absorbed. However, only one articulated lever 4 or more than two articulated levers 4 can also be provided.

In particular, it is also evident from the following figures that both articulated levers 4 are in each case connected in an articulated manner to the first fitting part 2 by a first hinge pin 2*a* and to the second fitting part 3 by a second hinge pin 3*c* (i.e., via the same hinge pins 2*a*, 3*c*, respectively). The articulated levers 4 can thus move not independently, but only at the same time as each other. The second articulated lever 4 thus merely serves to structurally reinforce the first articulated lever 4.

FIGS. 3*a* to 3*d* show top views of a part of a piece of furniture 100 in various steps during the transfer of the piece of furniture 100 from a first into a second position, and FIGS. 4*a* to 4*d* show perspective views of a fitting 1 in the same steps.

Figure 3A:
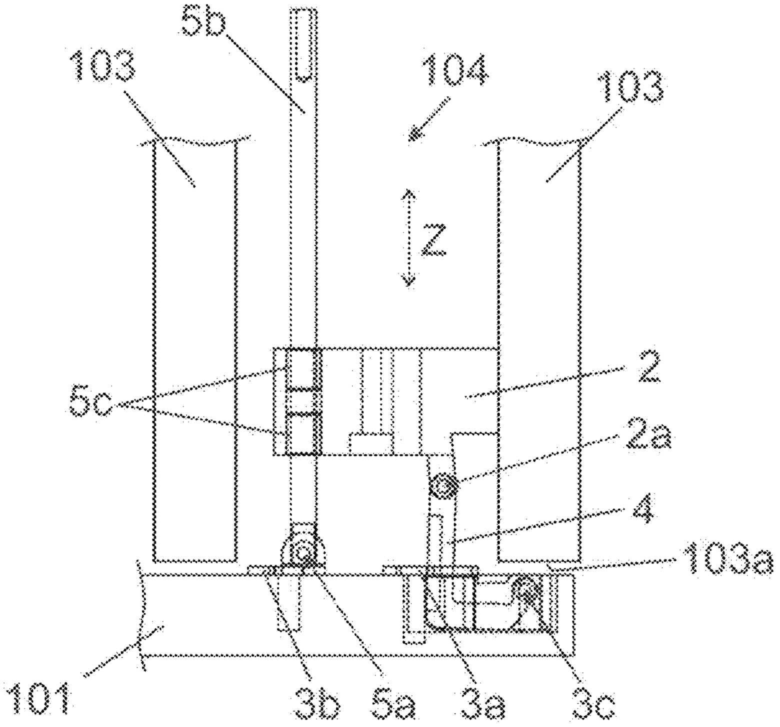
FIGS. 3*a-d* are top views of a part of a piece of furniture in various steps during the transfer of the piece of furniture from a first into a second position.
Figure 4A:
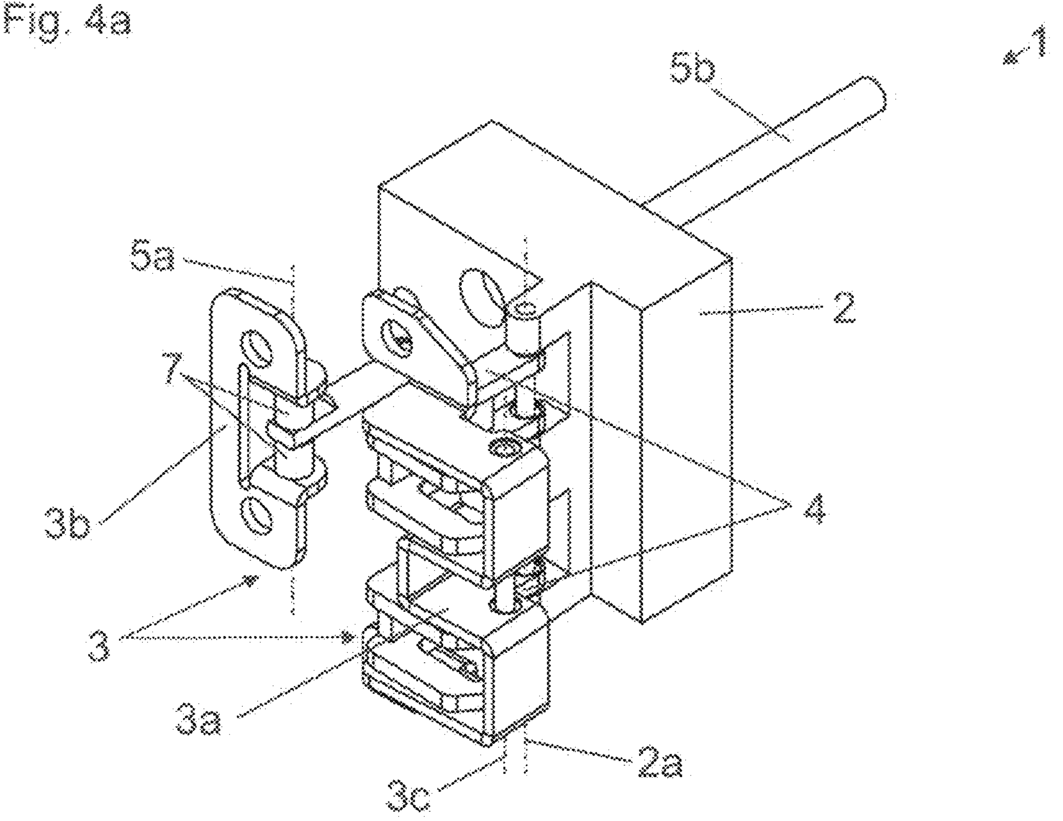
FIGS. 4*a-d* are perspective views of a fitting in various steps during the transfer of the piece of furniture from a first into a second position.

The fitting 1, and thus the piece of furniture 100, is in a first position in FIGS. 3*a* and 4*a*. It can be seen that the pivoting element 101 covers a front side 103*a* of the side wall 103 substantially completely. The guide element 5*b* is arranged substantially completely inside the cavity 104.

Figure 3B:
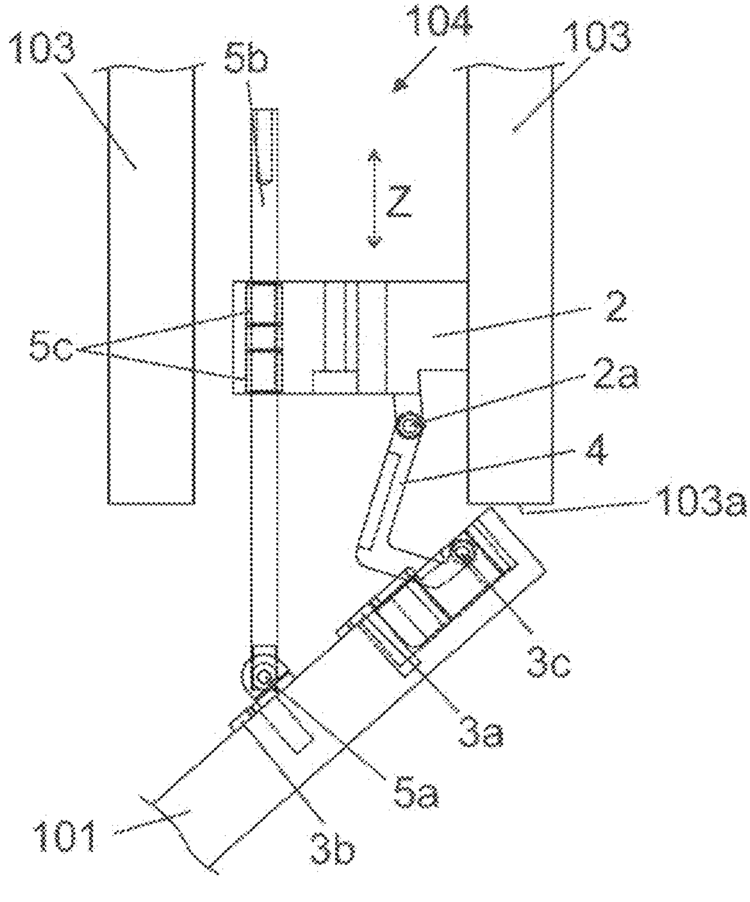
Figure 4B:
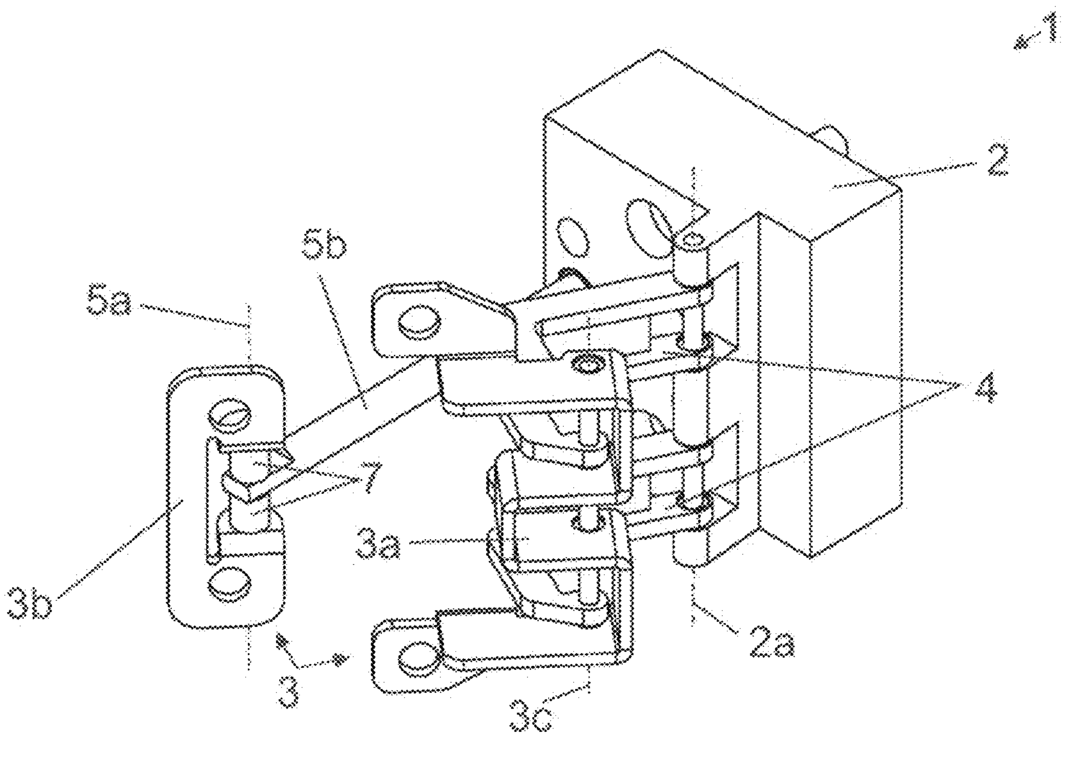

The pivoting element 101 has already been pivoted to a certain extent in FIGS. 3*b* and 4*b*. It can be seen that the guide element 5*b* guided in the mounting elements 5*c* has been linearly displaced. The articulated levers 4 have also been pivoted. A trajectory, along which the pivoting element 101 is pivoted, is defined via the articulated levers 4 and the arrangement of the hinge pins 2*a*, 3*c* and 5*a*.

Figure 3C:
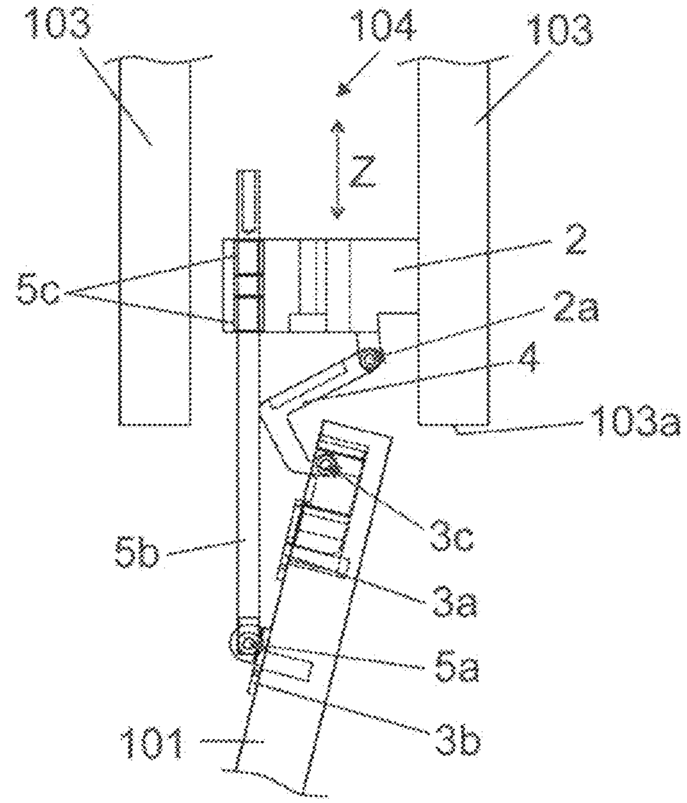
Figure 3D:
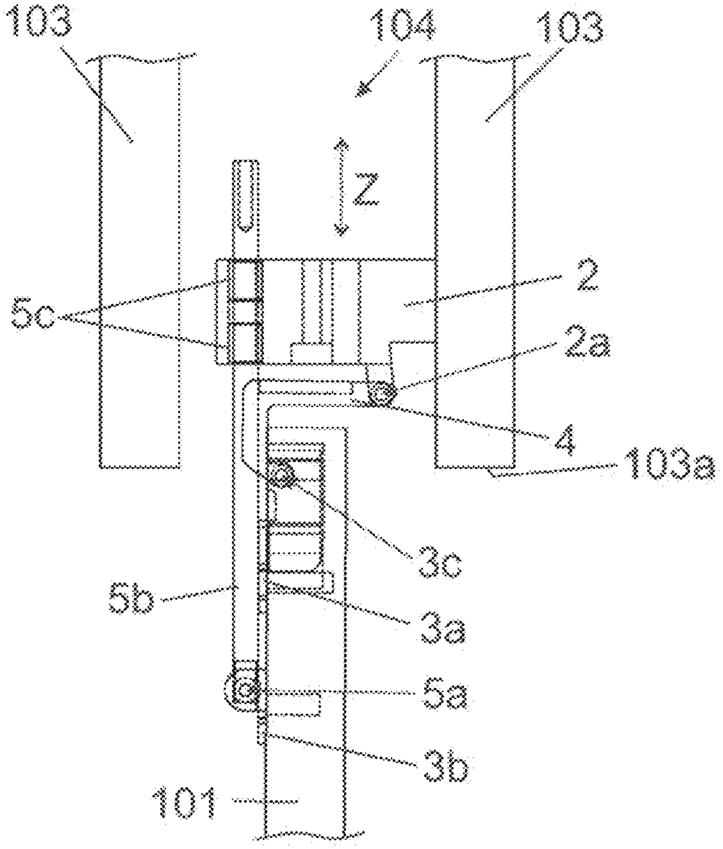
Figure 4C:
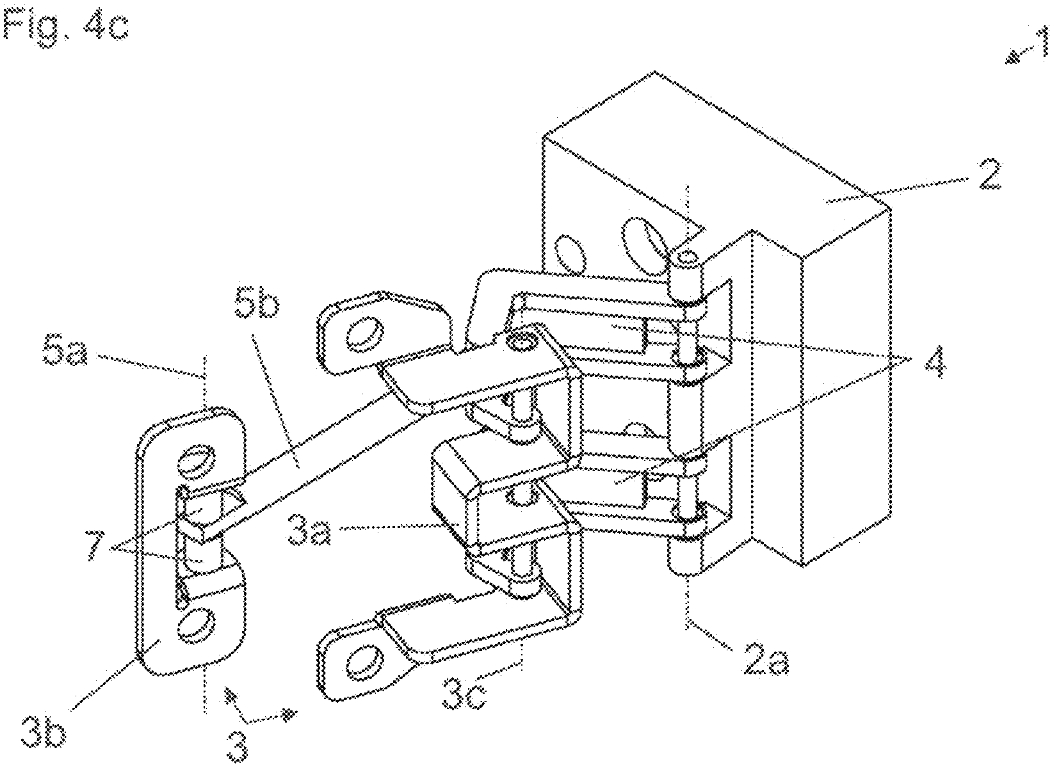
Figure 4D:
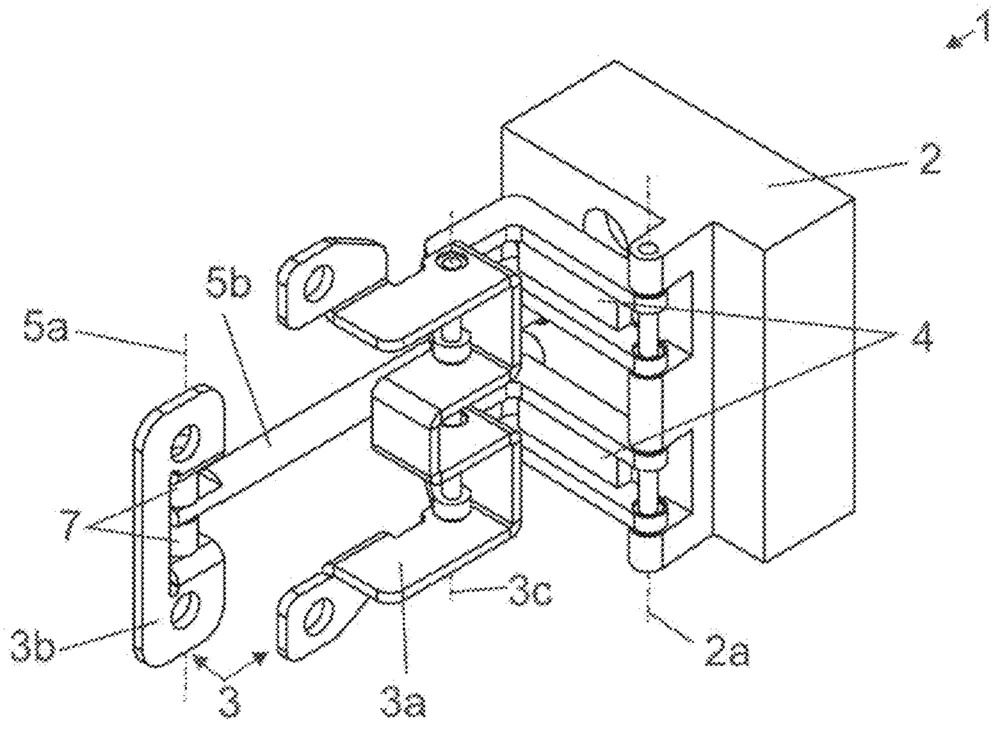

The pivoting element 101 has been pivoted still further in FIGS. 3*c* and 4*c* and into the second position in FIGS. 3*d* and 4*d*. It can be seen that the pivoting element 101 is guided by the articulated levers 4 and the arrangement of the first, second, and third hinge pins 2*a*, 3*c*, 5*a* such that the front side 103*a* of the side wall 103 is concealed in the first position. In the second position, however, the pivoting element 101 is arranged parallel to the side wall 103 and can travel into a cavity 104 formed by the side wall 103 and a further side wall 103. This traveling movement is effected in a depth direction Z of the stationary support 102 or of the cavity 104.

LIST OF REFERENCE NUMBERS

1 fitting

2 first fitting part

*2a* first hinge pin
*2b* recess
3 second fitting part
*3a* first part
*3b* second part
*3c* second hinge pin
4 articulated lever
5 guide device
*5a* third hinge pin
*5b* guide element
*5c* mounting element
*5d* connecting section
6 connecting pin
100 piece of furniture
101 pivoting element
102 stationary support
103 side wall
*103a* front side
104 cavity
105 folding sliding door
106 interior space
Z depth direction

The invention claimed is:

1. A piece of furniture comprising:
a pivoting element,
a stationary support, and
a fitting movably mounting the pivoting element to the stationary support, the fitting including:
a first fitting part arranged on the stationary support,
a second fitting part arranged on the pivoting element, wherein the first fitting part and the second fitting part are movable relative to each other,
at least two articulated levers each respectively connected in an articulated manner to the first fitting part via a first hinge pin and in an articulated manner to the second fitting part via a second hinge pin, and
a guide device mounted linearly displaceably on or in a first one of the first fitting part and the second fitting part, and the guide device being connected in an articulated manner to a second one of the first fitting part and the second fitting part via a third hinge pin, wherein the third hinge pin is separate and spaced apart from the first hinge pin and/or the second hinge pin,
wherein the pivoting element is a movable furniture part and the stationary support is a furniture carcass, and
wherein the fitting is configured to allow the pivoting element to be moved between a first position, in which the pivoting element at least partially covers a front side of a side wall of the stationary support, and a second position, in which the pivoting element is movable in a depth direction of the stationary support.

2. The piece of furniture according to claim 1, wherein the at least two articulated levers are substantially L-shaped.

3. The piece of furniture fitting according to claim 1, wherein the guide device comprises a guide element and a mounting element, wherein the guide element is mounted linearly displaceably in the mounting element.

4. The piece of furniture according to claim 3, wherein the guide element has a connecting section connecting the guide element in an articulated manner to one of the first fitting part and the second fitting part via the third hinge pin.

5. The piece of furniture according to claim 3, wherein the guide element has a circular or polygonal cross-sectional area.

6. The piece of furniture according to claim 3, wherein the mounting element comprises a sliding element.

7. The piece of furniture according to claim 6, wherein the at sliding element is arranged in a recess in the first fitting part, and the guide element is guided linearly displaceably in the sliding element.

8. The fitting according to claim 6, wherein the sliding element of the mounting element is one of two sliding elements.

9. The piece of furniture according to claim 1, wherein the second fitting part is formed in two parts including a first part and a second part.

10. The piece of furniture according to claim 9, wherein the second hinge pin is connected to the first part of the second fitting part and the third hinge pin is connected to the second part of the second fitting part.

11. The piece of furniture according to claim 1, wherein the fitting is configured such that the pivoting element is substantially parallel to the side wall in the second position.

12. The piece of furniture according to claim 11, wherein the side wall of the stationary support is one of at least two side walls arranged to form a cavity therebetween, the fitting being configured to allow the pivoting element to move in the depth direction of the stationary support while in the second position.

13. The piece of furniture according to claim 1, wherein the fitting is a first fitting of at least two fittings movably mounting the pivoting element to the stationary support.

14. The piece of furniture according to claim 1, wherein the side wall of the stationary support is one of at least two side walls arranged to form a cavity therebetween, the guide device being arranged completely inside the cavity in the first position.

15. The piece of furniture according to claim 1, wherein the first fitting part and the second fitting part are pivotable relative to each other, and the at least two articulated levers consists of precisely two articulated levers.

* * * * *